Sept. 11, 1934.　　　　　H. H. TALBOT　　　　　1,973,515
FLYING SHEAR
Filed Aug. 26, 1932　　　4 Sheets-Sheet 4
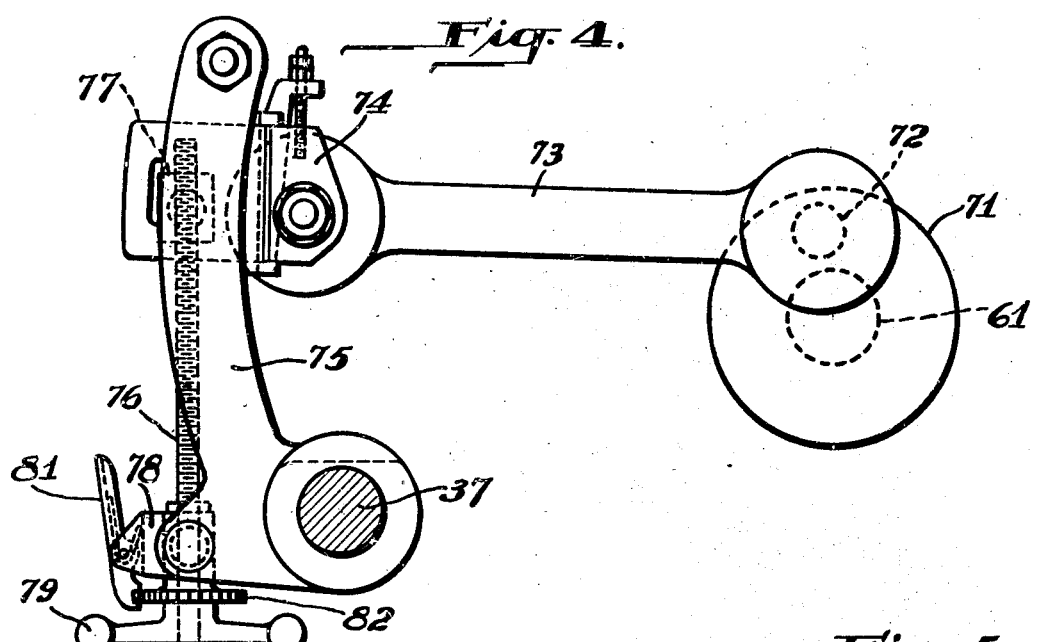
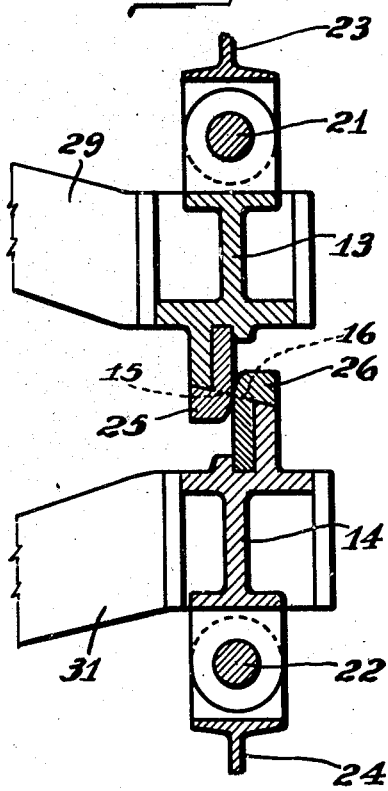
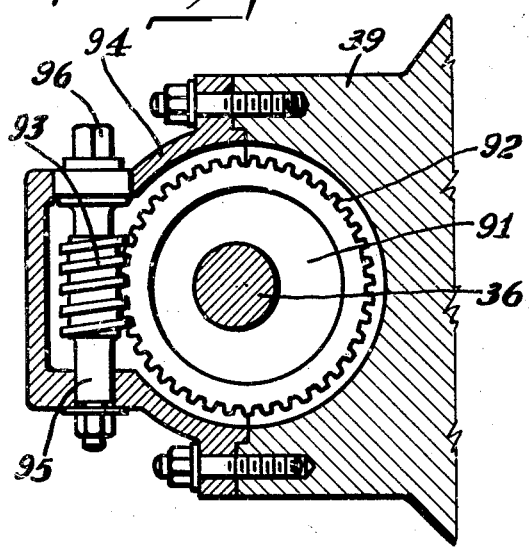
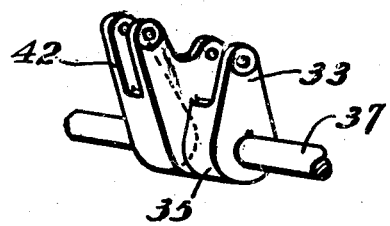
WITNESSES
A.B. Wallace.
J.E. Dickinson.
INVENTOR
Howard H. Talbot
by Brown Critchlow & Flick
his Attorneys Patented Sept. 11, 1934

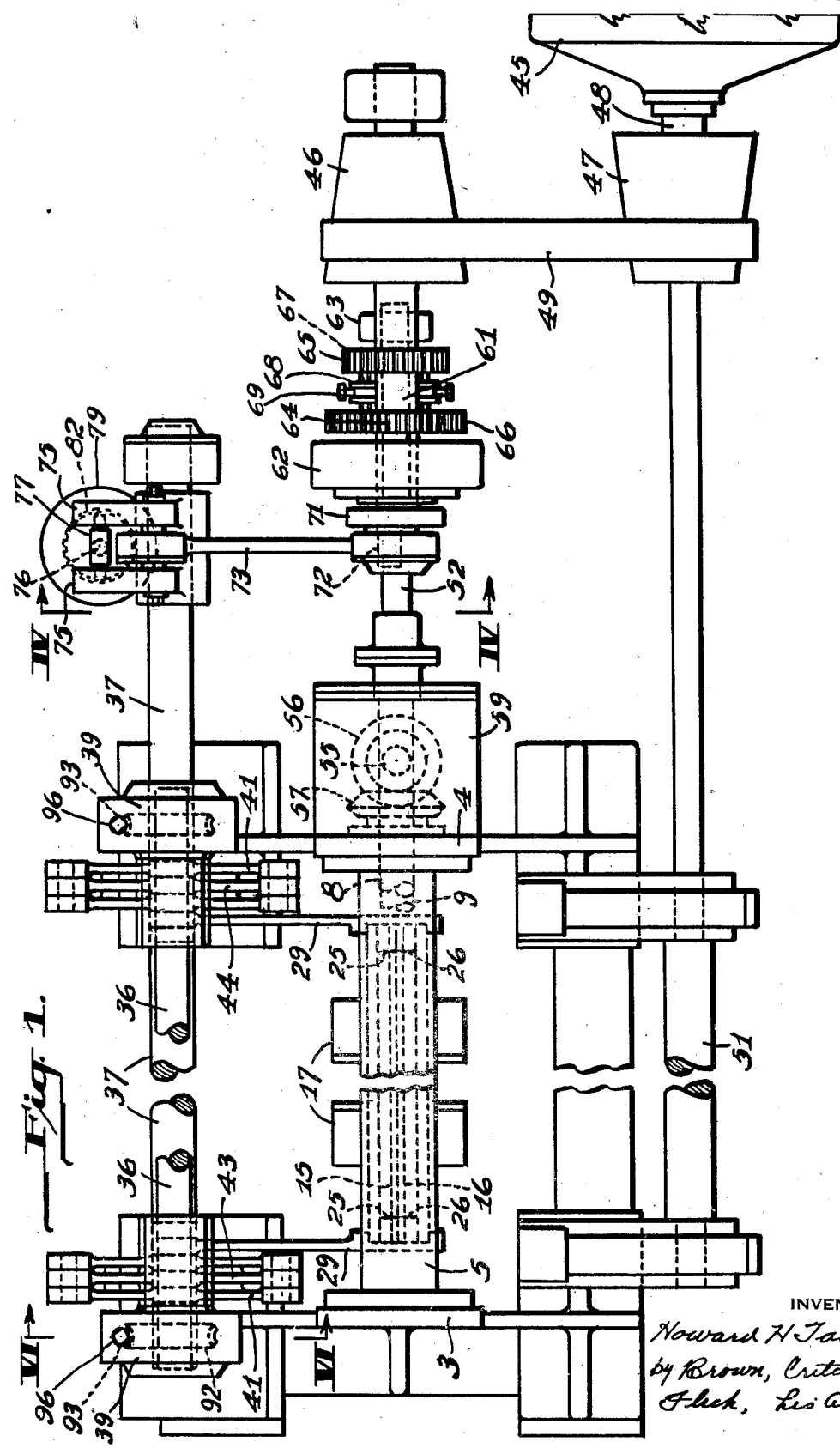

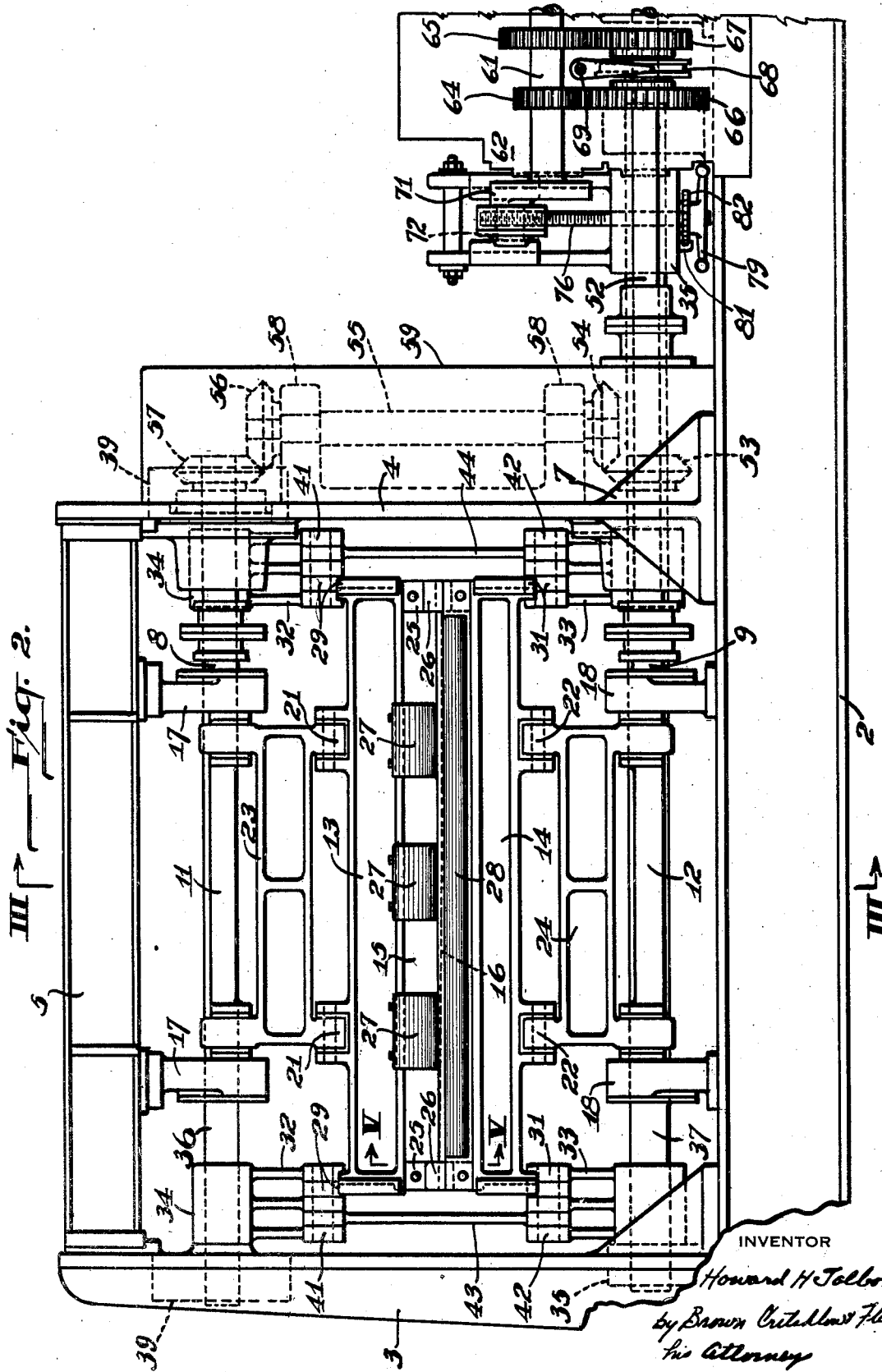

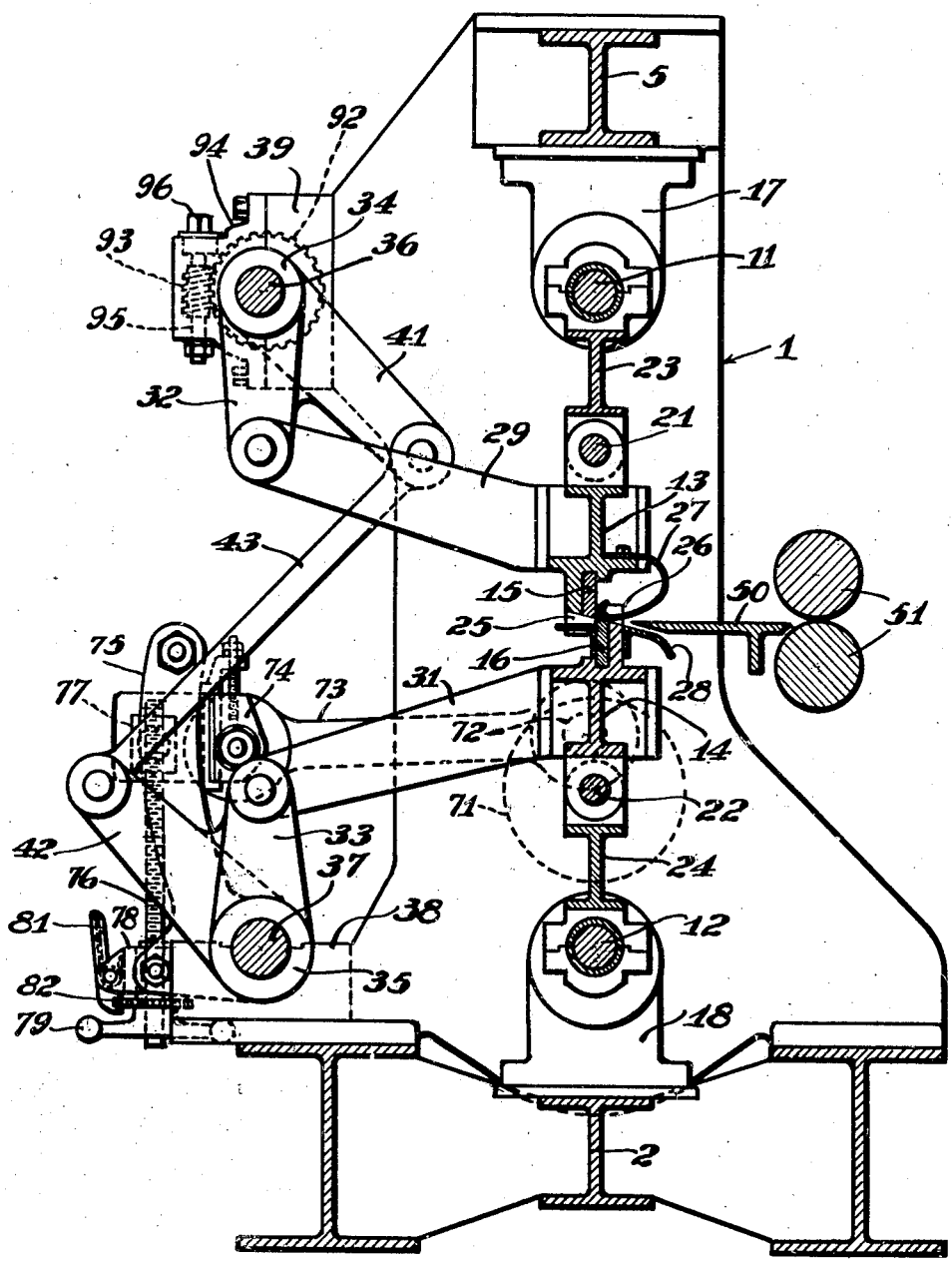

1,973,515

UNITED STATES PATENT OFFICE 1,973,515

FLYING SHEAR

Howard H. Talbot, Pittsburgh, Pa., assignor to United Engineering & Foundry Company, Pittsburgh, Pa., a corporation of Pennsylvania Application August 26, 1932, Serial No. 630,516

19 Claims. (Cl. 164—49)

This invention relates to what is known in the paper and metal-working art, and particularly the latter, as a flying shear, and has for its primary object the provision of a shear which is simple and sturdy of construction, dependable in operation, and which may be manufactured and placed on the market at an economical cost.

A more particular object is to provide a shear of the reciprocatory type which, while not necessarily so limited, is adapted more especially for use in cutting light gauge material, and in which provision is made for moving the cutting blades in the line of travel of the stock at the instant of cutting and for also varying their speed of movement in such direction irrespective of the overall speed of the shear, whereby adapting the shear to produce cuts of different lengths or to operate upon stock traveling at different speeds without fouling or buckling the stock when the cuts are made.

A further object is to provide a shear of this type employing a lever and linkage arrangement for guiding the cutting blades which is adapted to keep the blades substantially in a vertical position during the cutting period thereby improving the cut and permitting the use of "raked" or vertically overlapping tapered blades which provide an improved cutting operation quite similar to that of the usual stationary shear.

Another object is to provide a shear of the aforementioned character in which provision is made for insuring against overlapping or jamming of the cutting blades when they are moved into cutting opposition and for missing cuts where such is desired to expand the range of lengths which may be effected in the machine.

It is also an object to provide in a shear having the aforementioned advantages for preventing the stock from sticking to the cutting blades.

These and various other objects, as well as the various other novel features and advantages of the invention, will be apparent when the following detailed description is read in conjunction with the accompanying drawings, of which Fig. 1 is a plan view of a shear constructed in accordance with the invention; Fig. 2 a front elevation of the same; Fig. 3 a sectional view taken on the line III—III of Fig. 2; Fig. 4 a sectional view of the mechanism employed for rocking the shear blades taken on the line IV—IV of Fig. 1; Fig. 5 a fragmentary sectional view taken through the blade heads on the line V—V of Fig. 2; Fig. 6 a sectional view of the adjustable bearing in which the upper rocker shaft is supported taken on the line VI—VI of Fig. 1; and Fig. 7 a perspective view of one of the rockers mounted on the rocker shafts for imparting rotary movement to the blade heads.

Referring in detail to the drawings, the embodiment of the invention therein illustrated comprises a frame 1 which consists essentially of a base 2, and a pair of spaced uprights 3 and 4, which are joined together at their upper extremities by a cross beam 5. Mounted in suitable bearings in these uprights is a pair of blade-reciprocating shafts 8 and 9 which are provided at their centers respectively with cranks 11 and 12 for reciprocably actuating a pair of blade heads 13 and 14 equipped with shear-type cutting blades 15 and 16. For supporting such shafts at the opposite ends of their cranks they are mounted in suitable bearings carried by brackets 17 and 18 mounted on the upper cross beam 5 and the base 2 of the frame proper, while to permit rotary movement of the blade heads 13 and 14 so that the blades may be moved with the stock being operated upon when a cut is being made to thereby prevent their interfering with the continuous movement of the stock, they are pivotally connected by hinge joints 21 and 22 to a pair of connecting yokes or members 23 and 24 that in turn are loosely mounted upon the head reciprocating cranks 11 and 12, respectively, of the drive shafts 8 and 9.

To cause the blades to produce a true shearing action when they are reciprocated into cutting opposition by the actuating cranks 11 and 12, one of them at least, and in the present embodiment both blades 15 and 16 are provided with "raked" tapered cutting edges which shear the stock from left to right as the blades come together. With this form of cutting, the force required to produce the cuts is materially reduced as compared to overall contact type cutting.

To prevent the blades from overlapping or jamming when they are moved together, a pair of guides 25 and 26 (shown best in Fig. 5) is mounted on the ends of the heads 13 and 14 at the ends of the cutting blades. These guides comprise J-shaped members which are mounted in back-to-back relation and provided with rounded adjoining corners which function to deflect the blades and bring them into proper surface-to-surface contact in case they attempt to overlap and jam when forced together.

For preventing the stock from sticking to the face of the upper blade as it is moved forward after a cut, thereby causing it to buckle, a series of substantially U-shaped spring shields 27 is mounted in spaced relation across the face of this blade. These shields are attached at their one end along a horizontal plane to the blade head 13 with their lower edges resting substantially even with the cutting edge of the blade. Hence when a piece of material is cut the passing of the blade through the material causes the shields to be flexed upwardly, and as they are provided with sufficient resilient strength for such purpose, as the blade backs away after the cut the shields force the stock off the blade. For a similar purpose an apron-like shield 28 is mounted on the front face of the lower blade. This shield, however, also guides the stock smoothly over the latter blade.

To maintain the cutting blades in the proper parallel alignment when they are performing a cut, and for also rotating them in the direction of the line of travel of the stock so that they will have a lineal speed which is the same as that of the stock at the instant of cutting and thereby prevent them from interfering with the continuous movement of the stock, a pair of guiding and rocking arms or levers 29 and 31 is rigidly attached to the opposite ends of the blade heads 13 and 14. These levers which extend rearwardly from the blade heads are in turn pivotally connected to arms 32 and 33 formed on rockers 34 and 35, respectively, which are keyed to a pair of rocker shafts 36 and 37 suitably mounted in bearings 38 and 39 provided on the base 2 and the uprights 3 and 4. To positively insure synchronous action of the two blade heads the rockers 34 and 35 are provided with additional arms 41 and 42 which project at an angle to the arms 32 and 33 to which the rocker levers 29 and 31 are connected and on opposite sides of the latter, and to the ends of these a pair of connecting rods 43 and 44 is pivotally connected. Hence with this arrangement when the rocker shafts 36 and 37 are rocked to and fro they cause the two blade heads 13 and 14 to rock back and forth in the direction of the travel of the stock about the hinge joints 21 and 22 by which the blade heads are connected to the reciprocating yokes 23 and 24, and with the proper proportioning which they are given they maintain the cutting blade in a plane substantially at right angles to the plane of the material being severed when a cut is made.

To prevent the arms 32 and 33 of the rockers 34 and 35 from fouling the connecting rods 43 as the rockers are actuated, the arms 32 and 33 are disposed in different vertical planes than the arms 41 and 42, as shown in Fig. 7, while to provide for maintaining the cutting blades in proper parallel alignment and cutting relation with each other, from which they may depart if the parts are inaccurately made or if they wear or are distorted, the bearings 39 are so constructed that the upper rocker shaft 36 may be adjusted to attain such end. To accomplish this objective, as shown best in Figs. 3 and 6, and particularly the latter, these bearings each comprise a circular bushing 91 in which the shaft 36 is eccentrically mounted and a worm gear 92 mounted on the periphery thereof to engage a worm 93 carried by a housing section 94 which holds the bearing on the frame. The shaft 95 of this worm is carried to the top of the bearing housing and provided with a non-circular end 96 for receiving a turning tool by which the bushing may be turned to adjust the rocker shaft 36 and thereby the relative cutting positions of the upper cutting blade and place it in proper cutting relation with the lower one in case it departs from such operative position.

A feature of such a lever and linkage arrangement for guiding and moving the blades, as distinguished from the usual sliding guide type of construction is that adjustable roller bearings (not shown because of the knowledge of such in the art) may be used in the various pivot and rocking joints, to thereby substantially eliminate all lost motion, which, if permitted, deleteriously effects the close registration of the cutting blades, as is required in the cutting of thin material.

For driving the shear a suitable source of operating power is connected to the lower crank or drive shaft 9, and in the present instance a motor 45 is employed for such purpose, being connected thereto by a cone-type speed changing connection comprising a cone 46 mounted on an extension 52 of shaft 9, a cone 47 mounted on the drive shaft 48 of motor 45, and an axially adjustable belt 49 which is passed about the two cones. The drive shaft 48 of the driving motor is also connected directly to a pair of pinch rolls 51 mounted in the front of the machine in line with the cutting pass for feeding the stock through the cutting blades. Preferably the driving motor is a variable speed type of motor whereby the speed of both the feed and the shear can be varied by the motor, although the relative speeds of the two may be readily varied by such a drive by merely adjusting the belt 49 on the driving cones 46 and 47, such being employed to vary the lengths of the cuts.

For driving the upper blade-reciprocating crank shaft 8 in synchronism with the cooperating lower and driving crank shaft 9 to which the driving cone 46 is connected by the extension 52, a miter gear 53 is mounted upon the latter at the edge of the upright 4 adjacent the cone 46 and meshed with a miter gear 54 mounted on a vertical shaft 55 which carries at its upper end a miter gear 56 that in turn is meshed with a miter gear 57 mounted on the end of the upper crank shaft 8, this vertical shaft 55 being supported in brackets 58 mounted on the upright 4. As a safeguard a housing 59 is provided around this connection and its associated gears.

For rocking the cutting blades in synchronism with the operation of their reciprocating cranks a stub shaft 61 is mounted in suitable bearings carried by a pair of brackets 62 and 63 directly above the extension 52 of the main drive shaft 9, and on it there is keyed a pair of gears 64 and 65 which are adapted to mesh with a cooperating pair of gears 66 and 67 mounted loosely on the extension 52. The sizes of these two sets of gears are made such that when the stub shaft is rotated through the agency of the gears 64 and 66 it will rotate at twice the speed of the drive shaft 9, and when through the agency of the gears 65 and 67, at the same speed as such shaft.

For selectively connecting the gears 66 and 67 to the drive shaft extension 52 a double-faced clutch 68 provided with an operating connection 69 is slidably keyed to such shaft between these gears in a position to be actuated by an operator at will. The purpose of such a dual driving connection will be presently described.

At the end of the stub shaft 61 adjacent the shear there is provided a crank wheel 71 equipped with a crank pin 72 on its exposed face which is eccentric to the center of such shaft. A connecting rod 73 is pivotally connected at one end to this pin and at the other to a block 74 adjustably mounted in a bifurcated rocker arm 75 which is keyed to the corresponding end of the rocker shaft 37. Thus each time the crank pin 72 on the flywheel 71 carried by the stub shaft is rotated the rocker shaft 37 is rocked an angular amount determined by the eccentricity of the pin 72 and the radial distance of the block 74 from the center of the rocker shaft 37 and this in turn through the aforementioned connections between the rocker shaft and the blade heads 13 and 14 determines the angular movement that is imparted to the cutting blades as they are reciprocated. To provide for varying the angular displacement of the blades so that they may be adjusted to have a horizontal cutting speed equaling the linear speed of the stock when operated at different reciprocating speeds, the connecting rod block 74 mounted in the rocker arm 75 connected to the rocker shaft is adjustably held in place by a screw 76 which is threadably engaged on a nut 77 mounted in the block and is held against axial movement in a bearing 78 on the hub of the arm. For turning this screw it is provided at its lower end with an adjusting wheel 79, while for maintaining it in a selected position a pawl 81 is mounted on the projection 78 forming the screw bearing and arranged to engage a ratchet wheel 82 mounted on the screw above the handwheel 79. Hence to adjust the horizontal speed of the blades all that is necessary to do is to turn the adjusting wheel 79 in the direction required to give the change of angular displacement of the blade heads desired.

In accordance with this construction, as the stock is fed into the shear by the pinch rolls 51, it passes over a support 50 and between the blade heads 13 and 14 which may be operated at any desired speed to determine the lengths of the cuts, that is, within limits determined by the adjustability of the drive, and, as will be appreciated from the foregoing, by adjusting the block 74 in the rocker arm 75 mounted on the rocker shaft 37, the rocking action of the blade heads may be readily adjusted to insure the blades moving in synchronism with the stock at the instant of cutting, irrespective of the reciprocatory speed of the blade heads.

To increase the range of lengths which may be produced by the shear, the above described dual drive for the rocker shaft is provided. For the shorter lengths the stub shaft 61 is connected to the extension 52 of the main drive shaft by gears 65 and 67 of this driving connection which produces one rocking action of the shear heads for each reciprocation, and when so operated a cut is produced each time the blades come together. For longer cuts, however, the clutch 68 is moved to engage gear 66 which engages gear 64 and drive shaft 61 at twice the speed of the main drive shaft extension 52. When so driven the blade heads are reciprocated twice with each reciprocation of the heads with the result that the cutting blades are so rotated by the rocker mechanism that they are thrown angularly out of cutting position every other time they are reciprocated. Hence they produce a cut only on alternate reciprocation. Thus with the speed adjustment available the range of lengths which the machine will produce is in this way practically doubled. It is appreciated, however, that this range of cuts can be still further increased by adding other gearing combinations or clutch and ratchet constructions, many of which are well known in the art, for driving the rocker shaft.

According to the provisions of the patent statutes, I have explained the principle and operation of my invention, and have illustrated and described what I now consider to be its best embodiment. However, I desire to have it understood that, within the scope of the appended claims, the invention may be practiced otherwise than as specifically illustrated and described.

I claim:

1. A flying shear comprising a shear frame, a pair of blade carriers equipped with shear blades pivotally mounted on eccentrics for relative movement in said frame, means for actuating said eccentrics to reciprocably move said carriers into and out of cutting opposition to one another, rocker means pivotally connected to said carriers and driven independently thereof for both guiding said blades in their cutting operation and rocking them in the direction of the line of travel of the material being severed when a cut is made, and means actuated in synchronism with said blade reciprocating means for driving said rocking means.

2. A flying shear comprising a shear frame, a pair of blade carriers equipped with shear blades pivotally mounted on eccentrics for relative movement in said frame, means for actuating said eccentrics to reciprocably move said carriers into and out of cutting opposition to one another, rocker means pivotally connected to said carriers and driven independently thereof for both guiding said blades in their cutting operation and moving them in the direction of the line of travel of the material being severed when a cut is made, means for varying the amplitude of the rocking movement produced by said guiding and rocking means, and means actuated in synchronism with said blade reciprocating means for driving said rocking means.

3. A flying shear comprising a shear frame, a pair of cutter actuating shafts mounted in said frame, a pair of connecting elements eccentrically mounted upon said shafts, a pair of blade carriers equipped with shear blades pivotally connected to said connecting elements for reciprocating movement therewith, means connected to each of said carriers for guiding the movement thereof, power-driven rocker means pivotally connected to said guiding means for rocking the carriers in the direction of travel of the stock being severed when a cut is made, means for driving said cutter shafts, and means also driven by said driving means for positively actuating said rocker means.

4. A flying shear comprising a shear frame, a pair of cutter actuating shafts mounted in said frame, a pair of eccentrics mounted upon said shafts, a pair of blade carriers equipped with shear blades pivotally connected by connecting elements to said cutter shafts for reciprocating movement therewith, a lever connected at one end to each of said carriers for guiding their movement, power-driven rocker means connected to the opposite end of each of said levers for rocking the carriers in the direction of travel of the stock being severed when a cut is made, means for driving said cutter operating shafts, and means driven by said driving means for actuating said rocker means.

5. A flying shear comprising a shear frame, a pair of cutter operating shafts mounted in said frame, a pair of connecting elements mounted upon eccentrics provided on said shafts, a pair of blade carriers equipped with shear blades pivotally connected to said connecting elements for reciprocating movement therewith, a lever connected at one end to each of said carriers for guiding the movement thereof, power-driven rocker means connected to the opposite end of each of said levers for rocking the carriers in the direction of travel of the stock being severed when a cut is made, means for driving said cutter operating shafts, means driven by said driving means for actuating said rocker means, and means for varying the angular movement imparted by said rocker means to said carriers.

6. A flying shear comprising a shear frame, a pair of blade carriers equipped with cutting blades mounted for reciprocatory movement in said frame, means for individually reciprocating said carriers, means driven independently of said carriers and in synchronism with said carrier driving means for both positively guiding said blades and imparting an angular rocking movement to said blade carriers, and means for preventing the material severed by the blades from sticking to them after a cut is made.

7. A flying shear comprising a shear frame, a pair of blade carriers equipped with cutting blades mounted for reciprocatory movement in said frame, means for reciprocating both of said carriers, means driven independently of said carriers and in synchronism with said carrier reciprocating means for guiding said blades and positively imparting an angular rocking movement to said blade carriers and means provided on said blades for preventing the material severed by the blades from sticking to them.

8. A flying shear comprising a shear frame, a pair of blade carriers equipped with cutter blades, a pair of drive shafts for actuating said carriers, means eccentrically connecting said carriers to said shafts, means for conjointly driving said shafts to reciprocably move said carriers into and out of cutting opposition, means driven by said driving means for individually and positively rocking said carriers in the direction of the cutting pass and means for adjusting said rocking means to maintain said blades in the proper cutting relation when they move into and out of cutting opposition.

9. A flying shear comprising a shear frame, a pair of blade carriers equipped with cutting blades, a pair of drive shafts for actuating said carriers, said carriers being mounted for reciprocatory movement in said frame, means eccentrically connecting said carriers to said shaft, means for feeding the stock to be severed into the shear, means for rocking said blade carriers in the line of travel of the stock when a cut is made, means for driving said feeding means, said carriers and said rocking means in synchronism with each other, means for varying the relative speed of said carriers and said feeding means, and means for varying the amplitude of the rocking movement imparted to said cutting blades by said rocking means.

10. A flying shear comprising a shear frame, a pair of blade carriers equipped with cutting blades mounted for reciprocatory movement in said frame, a pair of drive shafts provided with eccentrics connected to said carriers, means for driving said drive shafts, means for continuously feeding stock to be severed between said blades, means operated independently of said drive shafts for rocking said blade carriers in the line of travel of the stock when a cut is made, means for driving said feeding means and said carriers in synchronism with each other, means for varying the relative speed of said carriers and said feeding means, means driven in synchronism with said carriers for actuating said blade rocking means, and means for varying the amplitude of the rocking movement imparted to said cutting blades by said rocking means.

11. A flying shear comprising a shear frame, a pair of blade carriers equipped with cutting blades mounted for reciprocatory movement in said frame, means for feeding the stock to be severed into the shear, means for rocking said cutting blades in the line of travel of the stock when a cut is made, means for driving said feed means, said carriers and said rocking means in synchronism with each other, means for varying the relative speed of said carriers and said feeding means, means for varying the amplitude of the rocking movement imparted to said cutting blades by said rocking means, and means for adjusting said rocking means to maintain said cutting blade in the proper cutting alignment.

12. A flying shear comprising a shear frame, a pair of blade carriers equipped with cooperating cutting blades, a pair of spaced shafts mounted in said frame for supporting and actuating said blade carriers, means for driving said shafts, eccentrics on said shafts for reciprocating said carriers, connecting elements mounted upon said eccentrics and pivotally connected to said carriers, a pair of rocker shafts also mounted in said frame, rocker members mounted on said shafts, levers connecting said rocker members to said blade carriers for rocking the latter in the line of the cutting pass, links connecting the rocker members on one of said rocker shafts with those on the other, and adjustable means connecting said driving means to said rocker shafts so as to drive the latter in synchronism with said shear actuating shafts.

13. A flying shear comprising a shear frame, a pair of blade carriers equipped with cooperating cutting blades, a pair of spaced shafts mounted in said frame for supporting and reciprocating said blade carriers, means for driving said shafts, eccentrics on said shafts for reciprocating said carriers, connecting elements mounted upon said eccentrics and pivotally connected to said carriers, a pair of rocker shafts mounted in said frame, rocker members mounted on said shafts, levers connecting said rocker members to said blade carriers for rocking said carriers in the line of the cutting pass, means driven in synchronism with said cutter shafts for driving said rocker shafts, means for adjusting one of said rocker shafts to adjust the cutting engagement of said cutting blades, links connecting the rocker members on one of said rocker shafts with those on the other, means actuated in synchronism with said carriers for feeding material to be severed into said shear, means for varying the relative speed of said feeding means and said carriers, and means for varying the amplitude of the rocking movement imparted by said rocking means to said carriers.

14. A flying shear comprising a shear frame, a pair of blade carriers equipped with cooperating cutting blades and means for preventing material being severed by the cutting blades from sticking to them when a cut is made, a pair of spaced shafts mounted in said frame for supporting and actuating said blade carriers, eccentrics on said shafts for reciprocating said carriers, connecting elements mounted upon said eccentrics and pivotally connected to said carriers, a pair of rocker shafts mounted in said frame, rocker members mounted on said shafts, levers connecting said rocker members to said blade carriers for rocking said carriers in the line of the cutting pass, means for adjusting one of said rocker shafts to adjust the cutting engagement of said cutting blades, links connecting said rocker members on one of said rocker shafts with those on the other, means for feeding material to be severed into said shear, means for driving said feeding means, adjustable means connecting said driving means to said blade carrier actuating shafts so as to be driven thereby, and adjustable means connecting said driving means to said rocker shafts so as to drive the latter in synchronism with said shear actuating shafts.

15. A flying shear comprising a shear frame, a pair of blade carriers equipped with cutting blades mounted for reciprocatory movement in said frame, means for reciprocating said blade carriers transversely of the line of pass of the stock through the shear, means for moving said blade carriers in the direction of travel of the stock when a cut is being made, means for causing said cutting blades to tend to overlap when they are moved together, and means for so deflecting said blades as to prevent any such overlapping and also to insure their moving in proper cutting contact as they pass each other.

16. A flying shear comprising a shear frame, a pair of blade carriers equipped with cutting blades mounted for reciprocatory movement in said frame, means for reciprocating said blade carriers transversely of the line of pass of the stock therebetween, means for rocking said carriers in the direction of travel of the stock when they are moved together, and means for taking up any play which may occur in said rocking means when the carriers are moved together and in such a way as to insure the cutting blades passing each other in proper cutting contact.

17. A flying shear comprising a shear frame, a pair of blade carriers equipped with cutting blades mounted for reciprocatory movement in said frame, means for rocking said carriers in the direction of the line of travel of the material through the shear, means for adjusting said rocking means to vary the relative planes of movement of the cutting blades as the carriers move together, and a pair of guiding cams mounted on the opposite ends of said blades for taking up any play which may occur in said rocking means and also for insuring said cutting blades moving in proper cutting contact as they are moved together.

18. A flying shear comprising a shear frame, a pair of blade carriers equipped with raked cutting blades mounted for reciprocatory movement in said frame, means for individually reciprocating said carriers, means driven independently of said carriers and in synchronism with said carrier driving means for positively guiding said blades and imparting an angular rocking movement to said blade carriers, and cam means mounted on the ends of said carriers for taking up any play which may occur in said carrier rocking and guiding means and for preventing said blades from interfering with each other as they are moved together.

19. A flying shear comprising a shear frame, a pair of blade carriers equipped with cutting blades mounted for independent reciprocatory movement in said frame, means for reciprocating said blade carriers transversely of the line of pass of the stock therebetween, means for rocking said carriers in the direction of travel of the stock and also for maintaining the cutting blades at right angles to the stock when they are moved together, means for driving said carrier rocking means in synchronism with said carriers, and means for taking up any play which may occur in said rocking means when the carriers are moved together whereby insuring the cutting blades passing each other in proper cutting contact when a cut is made.

HOWARD H. TALBOT.